United States Patent
Wesson

[15] 3,659,761
[45] May 2, 1972

[54] BICYCLE SIDE RACK FOR SURFBOARD

[72] Inventor: Bobby Dean Wesson, Santa Barbara, Calif.
[73] Assignee: Jeffrey Douglas White, Santa Barbara, Calif. a part interest
[22] Filed: Oct. 13, 1970
[21] Appl. No.: 79,723

[52] U.S. Cl. .................................................. 224/39 R
[51] Int. Cl. ............................................... B62j 11/00
[58] Field of Search .......... 224/32 R, 39 R, 42.45 R, 42.46 R, 224/42.43

[56] References Cited

UNITED STATES PATENTS

| | | | |
|---|---|---|---|
| 2,302,300 | 11/1942 | Davies | 224/42.45 R |
| 2,907,506 | 10/1959 | Sammons | 224/42.45 R |
| 3,329,323 | 7/1967 | Tanaka | 224/41 |
| 672,540 | 4/1901 | Speir | 224/35 UX |

FOREIGN PATENTS OR APPLICATIONS

| | | | |
|---|---|---|---|
| 709,781 | 5/1931 | France | 224/39 R |
| 517,970 | 1953 | Netherlands | 224/39 R |

*Primary Examiner*—Gerald M. Forlenza
*Assistant Examiner*—Jerold M. Forsberg
*Attorney*—Pastoriza & Kelly

[57] ABSTRACT

A surfboard carrier rack has fore and aft brackets extending from one side of a bicycle. The brackets coact with corresponding adjustable braces which are looped at least partially around the surfboard forward and rearward sections to resiliently suspend the surfboard while holding it generally in a vertical plane.

6 Claims, 4 Drawing Figures

Patented May 2, 1972

3,659,761

INVENTOR:
BOBBY DEAN WESSON
BY
Pastoriza & Kelly
ATTORNEYS

BICYCLE SIDE RACK FOR SURFBOARD

BACKGROUND OF THE INVENTION

This invention relates to carrying racks for vehicles and more specifically to a carrying rack structured for attachment to one side of a two-wheel vehicle for the purpose of mounting a surfboard aligned substantially in a vertical plane and parallel with the vehicle centerline axis.

When a surfing enthusiast attempts to haul his surfboard by bicycle it is both a frustrating and dangerous endeavor. Most surfboards are longer than conventional two-wheel vehicles such as bicycles and are relatively bulky with the result that surfboards are very unwieldy and cumbersome to carry in this manner. When the surfer wraps his arm around the center of the surfboard in an effort to firmly grasp the surfboard while attempting to steer the vehicle with only one hand, the surfboard oscillates up and down as the surfer peddles the bicycle and it becomes unavoidably very difficult to hold. The surfer soon becomes weary from the physical strain of trying to both manually hold and transport the surfboard and this may result in impaired maneuverability and be a significant contributing factor in causing an accident that otherwise could be avoided.

Attempts have been taken to overcome these drawbacks by equipping bicycles with overhead carrier racks that succeed in eliminating some problems but replace them with a different set of problems. For this type of rack the surfboard is secured above the bicycle and aligned in a horizontal plane which results in clearance problems for persons of different height and also presents the risk of the surfboard acting as an air foil at which time it becomes a safety hazard. If the surfboard is unsatisfactorily secured to the carrier rack or a primary securement component is defective and the surfboard topples it will invariably strike and possible seriously injure the person.

Representative of this type of surfboard carrier rack is the structure disclosed in U.S. Pat. No. 3,338,484 to Hall. A related type of overhead carrier rack disclosed in U.S. Pat. No. 3,329,323 to Tanaka incorporates a support structure rigidly coupled by a yoke to the handle bars and by a swivel connection to the surfboard. If the swivel connection jams or otherwise fails then the steering mechanism would tend to lock and thereby imperil the person.

BRIEF DESCRIPTION OF THE DRAWINGS

The numerous benefits and unique aspects of the present invention will be fully understood when the following detailed description is followed in conjunction with the drawings in which.

SUMMARY OF THE INVENTION

Briefly stated this invention comprehends a relatively inexpensive, simple and durable rack capable of being removably installed on one side of a two-wheel vehicle for the purpose of safely and securely carrying an elongated flat article such as a surfboard.

In its broader aspects this invention encompasses a rack with a first bracket having an upright portion and an attachment end, and, a second bracket having an upright portion and an attachment end. The brackets are tandemly aligned and extend laterally outwardly from a common side of a two-wheel vehicle such as a bicycle. A pair of braces in the form of resilient straps are adjustably coupled to corresponding brackets in a manner so that they may be looped around forward and rearward portions of the surfboard which may then be carried alongside of the bicycle.

Connectors on opposing ends of each brace may be coupled to selected retaining elements formed on and aligned vertically along an associated bracket upright portion. In one embodiment the brace end connectors are hook shaped catches and the upright portion retaining elements are positioning holes. In another embodiment the brace end connectors are eyelets and the upright portion retaining elements are projections. The brackets carry holding pegs around which the braces may be looped and held taut during times when the surfboard is not being carried by the rack.

When the surfboard spans across the brackets oriented along one side of the bicycle it is suspended and supported substantially vertically by coaction between one bracket and brace at a forward location and by the other bracket and brace at a rearward location.

DETAILED DESCRIPTION OF THE PREFERRED EMBODIMENTS

Figure 1:
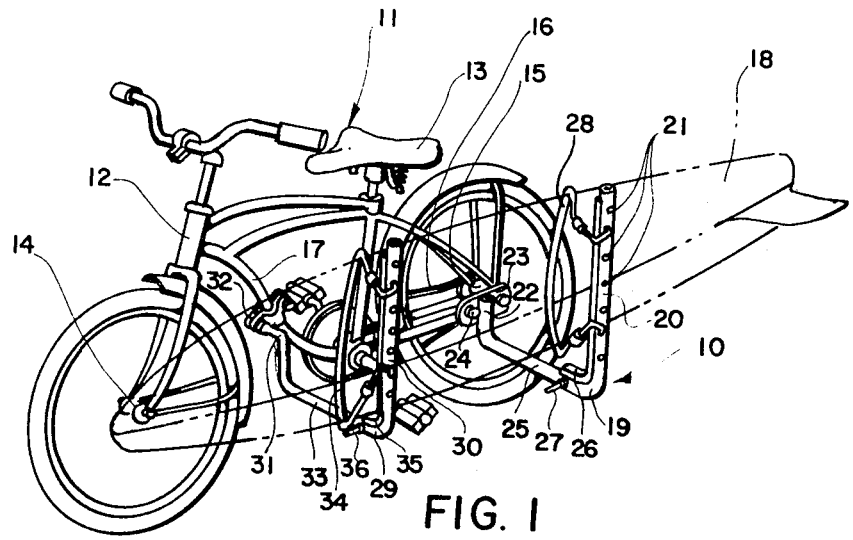
FIG. 1 is a perspective view showing a rack constructed in accordance with this invention mounted to a conventional bicycle in order to carry a surfboard shown in phantom lines along side the bicycle.

Referring now primarily to FIG. 1, a rack 10 is shown operatively mounted on one side of a two-wheel vehicle which in this illustration is a conventional bicycle 11. The bicycle 11 has a steering assembly 12, a seat 13, a front wheel assembly 14, a rear wheel assembly 15, a drive chain sprocket 16 installed on the right side of the bicycle 11 and an intermediate framework 17 for interconnecting the steering assembly 12 with the rearward portion of the bicycle.

A typical surfboard 18, shown in phantom lines for the sake of clarity, is positioned in and snugly held by the rack 10 and has a forward tip 18 a and a fin 18 b projecting outwardly and away from the bike 11.

The rack 10 includes a rearward bracket 19 that incorporates an upright portion 20 formed with a series of retaining elements shown in the form of vertically aligned holes 21 and an attachment end 22. The attachment end 22 may be demountably coupled to the bicycle rear wheel assembly 15 by any suitable mechanism such as by a mounting plate 23 and a pair of bolts 24. Between upright 20 and attachment end 22 is a horizontally extending intermediate cross piece 25 that is generally perpendicular with a vertical plane passing through the longitudinal center line of bicycle 11.

Secured along the inside face or side of upright 20 is a strip 26 of cushion material that may, for example, be sponge rubber, plastic foam, a vinyl coating, or any other suitable material to serve as a buffer in preventing the surfboard 18 from contacting and being scraped by upright 20 that is preferably constructed from high strength metal. Intermediate cross piece 25 carries a holding peg 27 for a purpose to be subsequently explained.

A rearwardly disposed brace 28, that coacts with bracket 19 to hold and stabilize a rearward portion of surfboard 18, is constructed of resilient or stretchable material and connectors are positioned on its opposing ends.

A forwardly disposed bracket 29, constructed similar to and aligned tandemly with bracket 19, has an upright 30 and an attachment end 31 that is secured to bicycle intermediate framework 17 by an adjustable clamp 32. A horizontally disposed cross piece 33, extending between attachment end 31 and upright 30, is arranged level with rearwardly disposed cross piece 25. The inner face of upright 30 is also covered with a strip 35 of cushion material and cross piece 33 carries a holding peg 36.

Figure 2:
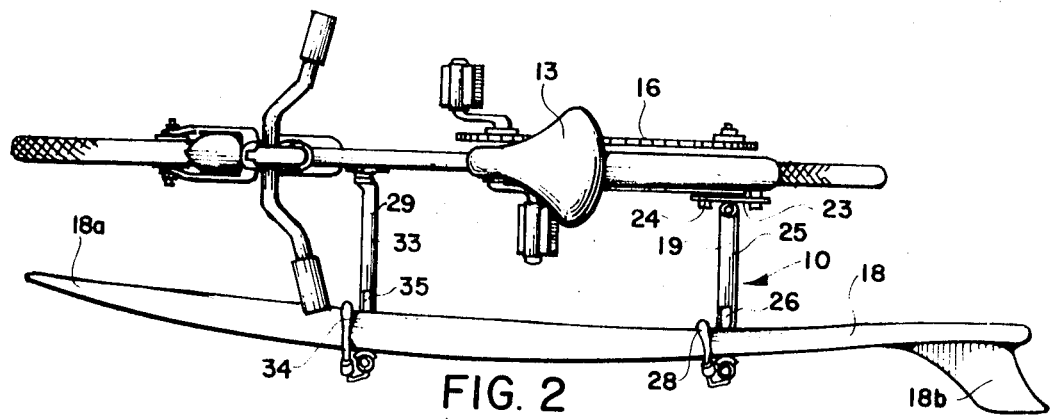
FIG. 2 is a top plan view showing that the longitudinal center lines of the bicycle and surfboard are parallel and that the surfboard is oriented in a substantially vertical plane.

Referring now to FIG. 2 it can be seen that when forward brace 34 and rearward brace 28, which are constituted by resilient straps, are looped around the innermost side of surfboard 18 with their end connectors coupled to the retaining elements of their companion bracket uprights, surfboard 18 is held substantially equidistantly along its length from the center line of bicycle 11 with the plane of surfboard 18 being aligned substantially vertically. By this orientation the person is afforded sufficient room to pedal and manipulate the bicycle 11 and wind or air resistance is minimized because surfboard 18 is aimed to knife ahead directly into the wind or air to reduce friction and drag.

Figure 3:
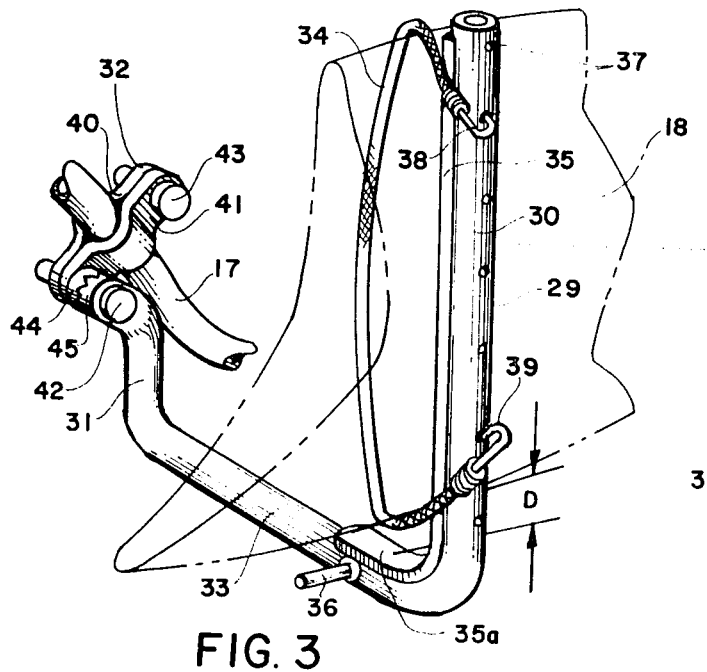
FIG. 3 is a perspective, fragmentary, sectional view showing a clamping mechanism by which the front bracket of the rack may be attached to the bicycle and hook shaped catches at the ends of the brace shaped to fit into and be held by retaining openings formed in the bracket; and, FIG. 4 is an alternative embodiment for mutually coupling the bracket and rack and illustrates a holding peg carried by the bracket that is being used to assist in maintaining the brace taut during times when the surfboard is not carried in the rack.

Referring now to FIG. 3 the retaining elements carried by upright 30 are retaining holes 37 into which the end connectors 38 and 39 of brace 34 may be positioned. Connectors 38 and 39 in this embodiment are shown as hook-shaped catches that my be adjustably inserted into selected retaining holes 37 to thereby accommodate surfboards of varying widths. The lower end 35a of cushion material strip 35 underlies the bottom edge of surfboard 18 which are mutually spaced by a gap D. In addition to being pressed snugly against the cushion material strips by the braces, the surfboard 18 is also suspended by the braces and held above the cross pieces so that the surfboard is prevented from contacting and possibly becoming damaged by the cross pieces. If the bicycle encounters a rut or bump and either the front or rear end of the surfboard is swung downwardly it will still be protected from damage by underlying lower section 35a of cushion material strip 35.

The adjustable clamp 32 by which bracket 29 is mounted to the bicycle includes a pair of mating plates 40 and 41 contoured with oppositely facing intermediate pickets which together act as a collar when the plates 40 and 41 are tightened by threaded bolts 42 and 43. Adjustable clamp 32 can thereby accommodate bicycle framework 17 of different diameters. Inasmuch as the intermediate framework 17 or diagonal strut may be sloped at varying angles for different bicycles, the adjustable clamp 32 may also accommodate this varying condition by way of a boss 44 fixed to plate 41 that has a serrated face for selectively seating and positively interlocking with the serrated face of a disc 45 rigidly fixed to attachment end 31.

Referring again to FIG. 1 it will be seen that adjustable clamp 32 is positioned at a higher level than mounting plate 23 and in order to assure that cross pieces 33 and 25 are aligned in a common horizontal plane it is necessary to make attachment end 31 depend through a longer distance than attachment end 22. Alternatively, cross piece 33 could project straight outwardly from adjustable clamp 32 in which case it would be necessary for attachment 22 to rise slightly so that the cross pieces would be aligned at the same level.

Figure 4:
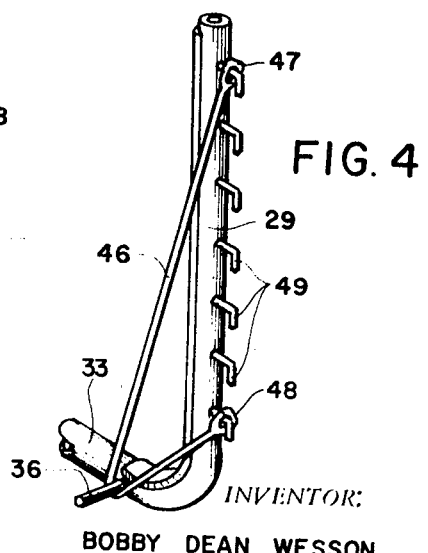

Referring to FIG. 4 which shows an alternative embodiment for interconnecting a bracket and brace, bracket 29 includes a series of vertically aligned projections 49 and the brace 46 is a resilient rubber strap whose opposing ends are formed with connector elements in the form of eyelets 47 and 48. The brace 46 is shown drawn around a holding peg 36 so that it may be held taut and prevented from swaying around where it might become caught on some object or entangle the person's foot during times when the surfboard or other elongated generally flat object is not being carried. The peg 27 shown in FIG. 1 coacts in the same manner with rearward brace 28

OPERATION

Keeping the above construction in mind it can be understood how many of the previously described disadvantages of conventional bicycle racks for carrying surfboards are substantially eliminated by this invention.

Initially the surfing enthuiast installs rearward bracket 19 by coupling mounting plate 23 to the bicycle rear wheel assembly 15. Then adjustable clamp 32 is adjustably secured to the bicycle intermediate framework 17 in a manner so that cross piece 33 is aligned in the same horizontal plane with cross piece 25 and in addition upright 30 is aligned perfectly erect.

The surfboard 18 is then arranged inside of uprights 20 and 30 with the lower connectors of the braces being interconnected with selected retaining elements. Each brace is then drawn tightly around the surfboard and their upper end connectors are connected with upper retaining elements so that the surfboard 18 will be pressed tightly against the cushion material strips while the surfboard is suspended and held safely above the intermediate cross pieces and by a space D.

The person may then haul the surfboard from place to place without fear that either the surfboard or he may become injured.

From the foregoing it will be evident that the present invention has provided a rack for carrying a surfboard alongside a bicycle in which all of the various advantages are fully realized.

What is claimed is:

1. A rack for carrying a surfboard alongside a bicycle, comprising:
   a. a bicycle having an intermediate framework between its steering assembly and seat, and, a rear wheel assembly;
   b. a first bracket having an upright portion and an attachment end coupled to the bicycle intermediate framework;
   c. a first brace adjustably coupled to the first bracket;
   d. a second bracket having an upright portion and an attachment end coupled to the bicycle rear wheel assembly; the first and second brackets having horizontally extending cross members between their attachment ends and upright portions and being tandemly aligned and arranged to project laterally from the same side of the bicycle; and,
   e. a second brace adjustably coupled to the second bracket, the braces being resilient straps arranged so their ends may be coupled to the upright portions of their corresponding brackets,
      wherein a surfboard spanning across the brackets and oriented along one side of the bicycle may be supported and held in a substantially vertical position by coaction between the first bracket and brace at a forward location and by the second bracket and brace at a rearward location, and,
      the resilient straps, upright portions and cross members are dimensioned and relatively positioned so that the resilient straps may be looped around the edges and at least one side of the surfboard in order to hold the surfboard against the upright portions and suspend the surfboard above the cross members.

2. The structure according to claim 1, wherein; the first bracket attachment end is clamped to the intermediate framework at a level higher than the bicycle rear wheel assembly.

3. The structure according to claim 2, wherein; the first bracket attachment end has a dual adjustment clamp for fitting intermediate frameworks of varying thickness and inclinations.

4. The structure according to claim 1, wherein; the braces are resilient straps whose ends have connectors so that the straps may be partially wrapped around the surfboard to urge it against their brackets and accommodate surfboards of varying widths.

5. The structure according to claim 4, wherein; the inner portions of the bracket uprights are covered with cushion material.

6. The structure according to claim 4, wherein; the bracket uprights have a plurality of retaining elements, the brace connectors are shaped to interconnect with the retaining elements; and, the brackets have horizontally extending cross members between their attachment ends and uprights, the cross members carrying holding pegs for holding the straps taut when the surfboard is not being carried by the rack.

* * * * *